(12) United States Patent
Mainardi

(10) Patent No.: US 6,511,255 B1
(45) Date of Patent: Jan. 28, 2003

(54) LOCKING DEVICE

(75) Inventor: Gianfranco Mainardi, Au (CH)

(73) Assignee: Frenotech, Liechtenstein (DE)

( * ) Notice: Subject to any disclaimer, the term of this patent is extended or adjusted under 35 U.S.C. 154(b) by 0 days.

(21) Appl. No.: 09/600,262

(22) PCT Filed: Nov. 29, 1998

(86) PCT No.: PCT/EP98/07704

§ 371 (c)(1), (2), (4) Date: Jul. 13, 2000

(87) PCT Pub. No.: WO99/38645

PCT Pub. Date: Aug. 5, 1999

(30) Foreign Application Priority Data

| Jan. 28, 1998 | (DE) | 198 03 214 |
| Jul. 26, 1998 | (DE) | 198 33 483 |
| Aug. 12, 1998 | (DE) | 298 14 483 U |
| Oct. 7, 1998 | (DE) | 198 46 187 |
| Oct. 29, 1998 | (DE) | 198 49 990 |

(51) Int. Cl.[7] ................................................. F16D 1/00
(52) U.S. Cl. ........................................ 403/365; 188/67
(58) Field of Search ..................... 403/322.1, 31, 403/322.3, 373, 374.1, 374.2, 365; 188/67

(56) References Cited

U.S. PATENT DOCUMENTS 4,214,795 A * 7/1980 Kakuminato
4,564,088 A * 1/1986 Takahashi et al.
5,184,700 A * 2/1993 Mainardi
5,823,300 A * 10/1998 Higuchi
6,044,934 A * 4/2000 Nemeth

FOREIGN PATENT DOCUMENTS

DE 27 19 822 A1 * 2/1979

* cited by examiner

Primary Examiner—Lynne H. Browne
(74) Attorney, Agent, or Firm—Antonelli, Terry, Stout & Kraus, LLP

(57) ABSTRACT

The invention relates to a fixing device, comprising two clamping jaws (33) arranged symmetrically to each other and each having a through hole (38) for a rod (12) or shaft passing through same, and an actuating piston (27) which can be actuated by means of a fluid in a piston chamber. The fixing device also comprises an actuating lug (30) which can be moved by the actuating piston for engaging the clamping jaws and moving them away from each other against the force of a spring (36) and about a pivoting bearing (35) from a first into an open second position. The center of each through hole is at a first distance to the pivoting bearing and at a second distance to the area where each actuating lug engages each clamping jaw. The invention is characterized in that the second distance is smaller than the first distance.

29 Claims, 7 Drawing Sheets

LOCKING DEVICE

FIELD OF THE INVENTION

The invention relates to a locking device.

BACKGROUND OF THE INVENTION

A locking device, such as shown in FIG. 7 of U.S. Pat. No. 2,806,723, has the disadvantage that it can only be located concentrically with respect to a rod or shaft that is to be locked. For this reason, essentially so-called locking cartridges have been developed that extend essentially perpendicularly to the rod or shaft to be locked. See, for example, German Patent Publication DE-A-40 12 524. Such known embodiments, however, have the disadvantage that they do not have a compact design, which limits their use.

The goal of the present invention is to provide a locking device with a compact design.

SUMMARY OF THE INVENTION

According to the invention, a locking device is provided in which two actuating jaws are mounted on a tilt bearing and have a through opening, with the distance from the midpoint of each through opening to the tilt bearing (first distance) and the distance from the midpoint of each through opening to the area of engagement of an actuating nose on each clamping jaw (second distance) being made so that the second distance is less than the first distance. A spring ensures that each clamping jaw abuts the surface of the rod to be locked in the vicinity of its through opening. This application force does not cause any clamping of the rod with the clamping jaw in this first position. It is only when a longitudinal movement of the rod is added that a self-clamping action is produced as a result of the considerable distance of the midpoint of the through opening from the tilt bearing on the one of the two clamping jaws which is located forward in the direction of movement of the rod. The clamping jaw located at the rear in the direction of movement of the rod does not lock and, even with the existing play of the locking cartridge, can abut the housing so that its clamping is released. The clamping jaw which is forward in the direction of movement, however, is moved away from the housing and can therefore not produce an undesired, premature release of the clamping. The spring must apply only enough force that the two clamping jaws are moved toward one another and abut the surface of the rod in the area of the through opening. The two clamping jaws in this position must of course have sufficient play by being spaced from one another in order to be able to exert a sufficiently reliable clamping action when the rod moves. Because no large springs and no large actuating levers are required, the locking device according to the invention can likewise have a compact design.

According to the invention, the actuating nose with its rear surface facing a supporting plane abuts the supporting plane of the actuating piston loosely, almost floating. As a result, the actuating piston can have a limited height without there being a danger that it will tilt when actuated, which would adversely affect the functional ability. Without the action of the actuating nose on the clamping jaws, the latter would be compressed by the force of the spring so that the clamping jaws in the first (unloaded) state would move toward one another around the tilt bearing. The through openings in the two clamping jaws, which grip the rod with limited play, in this first position produced by the force of the springs alone, clamp the rod. If the actuating piston is pneumatically actuated for example, the actuating nose is pushed between the clamping jaws and moved from the first-mentioned state, in which it is compressed by the force of the springs, into the second position, preferably into a parallel position of the two clamping jaws, so that the rod clamped by the limits of the through openings of the clamping jaws comes free and can be moved freely in this second position. This produces a short stroke to move the two clamping jaws into the second position.

The spring can be designed as an open, for example a toroidal, broken steel ring, or closed and for example can also be made of plastic. In the closed form, it can also be toroidal or a hollow cylinder. In the former case, it should be inserted into a circumferential groove that fits the shape of the spring. In the second case, with the plastic spring in the form of a hollow cylinder, assurance need only be provided that it can slip into its position, in other words as a result of impacts applied to its upper and/or lower sides. The spring can be located on the side facing away from the tilt bearing relative to the through openings of the clamping jaws and/or on the same side as the tilt bearing. The tilt bearing can be located as a point of contact of the two clamping jaws with one another and/or located in this area within the sleeve of the locking cartridge, or it can be a pin engaged separately in one end of the sleeve of the locking cartridge, along whose jacket the clamping jaws can move.

As a result of this design, without any fear of tilting the actuating piston, the latter can be made relatively short. Because of an actuating nose designed as a pin divided along the lengthwise axis, further shortening of the height is possible with this pin resting by its jacket on two correspondingly beveled guide surfaces of the clamping jaws and engaging them to displace the two of them from the first into the second position with minimal travel. This design permits an extremely limited height of the locking cartridge according to the invention.

By dividing each individual clamping jaw, at least two additional inner clamping jaws are provided whereby improved clamping function can be achieved without additional space being required. This advantageous improvement on the invention without considerable technical expense can be integrated into existing functioning systems, since only one part with no changes in the dimensions of the locking device, namely the two clamping jaws, must be replaced by the divided clamping jaws with one inner camping jaw each.

Especially advantageously, the locking device according to the invention can be used in a compact cylinder whose housing for this purpose has a preferably transverse cylindrical recess, preferably at right angles to the path of the rod to be locked.

BRIEF DESCRIPTION OF THE DRAWINGS

Embodiments of the invention are described in greater detail below with reference to the drawings. In the drawings, in cross section.

DETAILED DESCRIPTION

Figure 1:
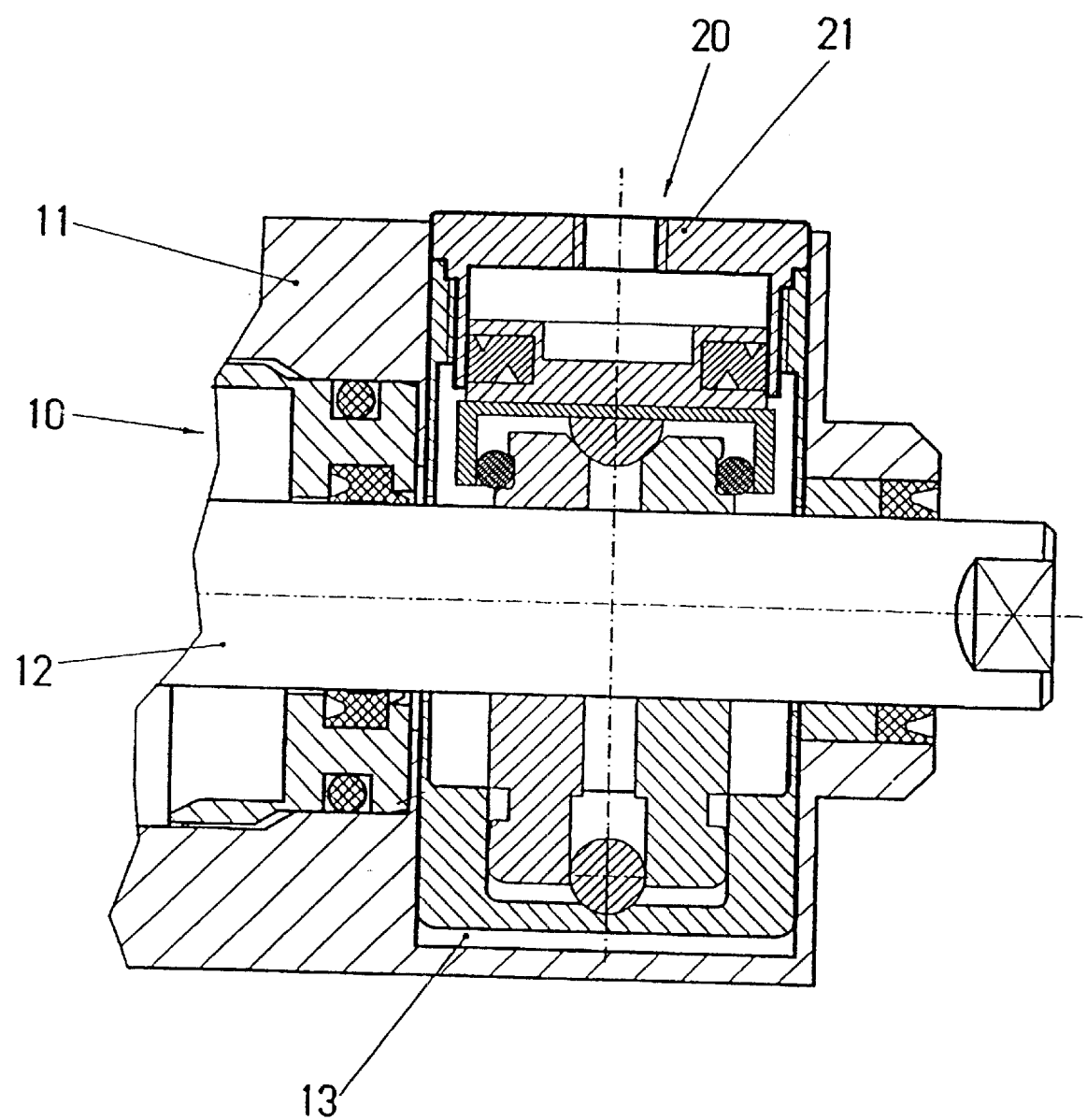
FIG. 1 shows the locking device designed as a locking cartridge in accordance with the invention in use in a compact cylinder.

FIG. 1 shows the front end of a compact cylinder 10 whose piston rod 12 projects to the right.

In housing 11, a recess 13 is provided which extends transversely to the axis of piston rod 12, preferably at right angles. In this recess 13, a locking device 20 is located and is made as a locking cartridge whose sleeve 21 is adapted to the shape of recess 13, or vice versa, and has through openings for rod 12 that can be locked by locking cartridge 20.

Figure 2:
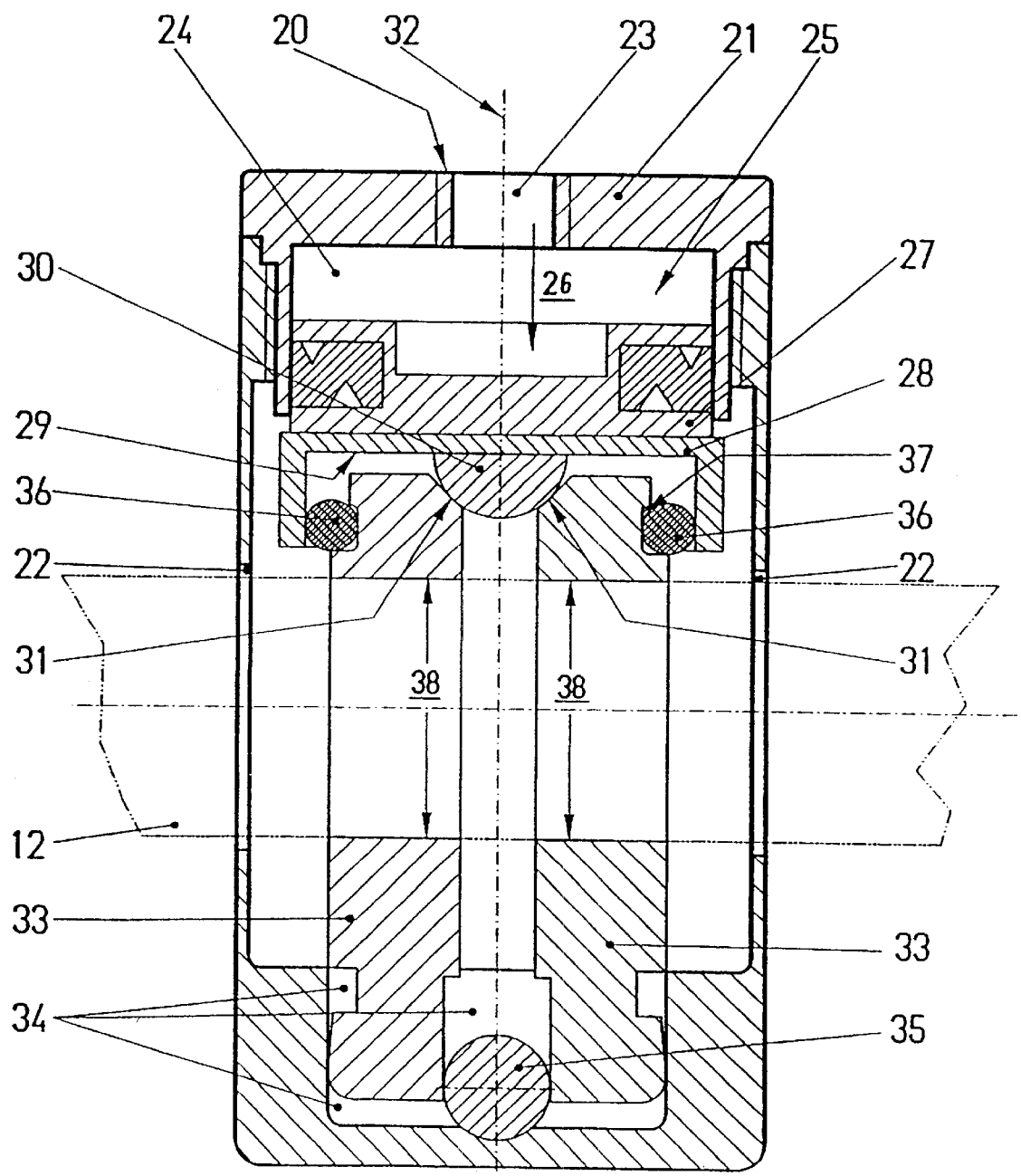
FIG. 2 shows the locking cartridge according to FIG. 1, alone and on a larger scale.

Locking cartridge 20 is shown in greater detail in FIG. 2. Sleeve 21 has openings 22 for piston rod 12. In addition, at the end of sleeve 21 (the upper end in FIG. 2), a supply opening 23 is provided by means of which piston chamber 24 can be filled by a fluid, preferably pneumatically. Thus, the piston 25 can be moved in the direction of arrow 26.

Actuating piston 25 is divided into two parts with a stroke part 27 and an actual actuating part 28 which contact each other on a plane on front side of stroke part 27 and a plane on the rear side of actuating part 28, forming in some sense a floating mount.

The actuating part 28 is designed as a lid which is U-shaped in cross section, which has on its side 29 facing away from the stroke part 27 an actuating nose 30, said nose being designed as a pin divided parallel to its central axis and mounted on the inside of the lid. Nose 30 is provided with two beveled control surfaces 31 to contact two clamping jaws 33 that are mounted symmetrically and movably relative to one another with respect to central plane 32 of locking cartridge 20, said jaws being tiltably mounted at the end located opposite actuating part 28, tiltably as tilt bearings in a depression 34 of sleeve 21 and kept at a distance from one another by means of a spacing rod 35 on sleeve 21, with spacing rod 35 also serving as a tilt bearing.

At the two ends of clamping jaw 33 with control surfaces 31, an O-ring 36 is also provided around the two clamping jaws 33 as a spring that is inserted in a circumferential groove 37 on the clamping jaws and which serves to hold the clamping jaws together at a distance from one another, and tilted around spacing rod 35 as a tilt bearing. In the first position (not shown), piston rod 12 is locked. When actuating piston 27, 28 is actuated, it then moves in the direction of arrow 26 with its actuating nose 30 against the two control surfaces 31 of clamping jaws 33, whereupon the latter move outward, away from one another in this area against the force of O-ring 36 surrounding them, whereupon the through openings (38) of the two clamping jaws 33 simultaneously release piston rod 12.

As a result of the lid-shaped design of actuating part 28, provision can also be made that the separating movement of the two clamping jaws 33 is limited by the surrounding edge of lid-shaped actuating member 28 as a stop. This second position (shown in FIG. 2) is maintained until pressure is no longer applied. Then, because of the force of O-ring 36 that acts as a spring, both the two clamping jaws 33 and the actuating nose 30 move in the direction opposite to the direction of arrow 26 (upward in FIG. 2) and so move the first position.

In the embodiments according to FIGS. 3 to 6, the unactuated position is shown on the left side relative to the plane of symmetry in the middle, and the non-clamped position is shown in the right side. Similar parts have similar reference numerals. The difference between all of the embodiments and that in FIG. 1 or 2 is that variously shaped springs are provided at different points and that spacing rod 35 is provided as a tilt bearing or is not provided at all, whereby in the latter case the clamping jaws abut one another.

Figure 3:
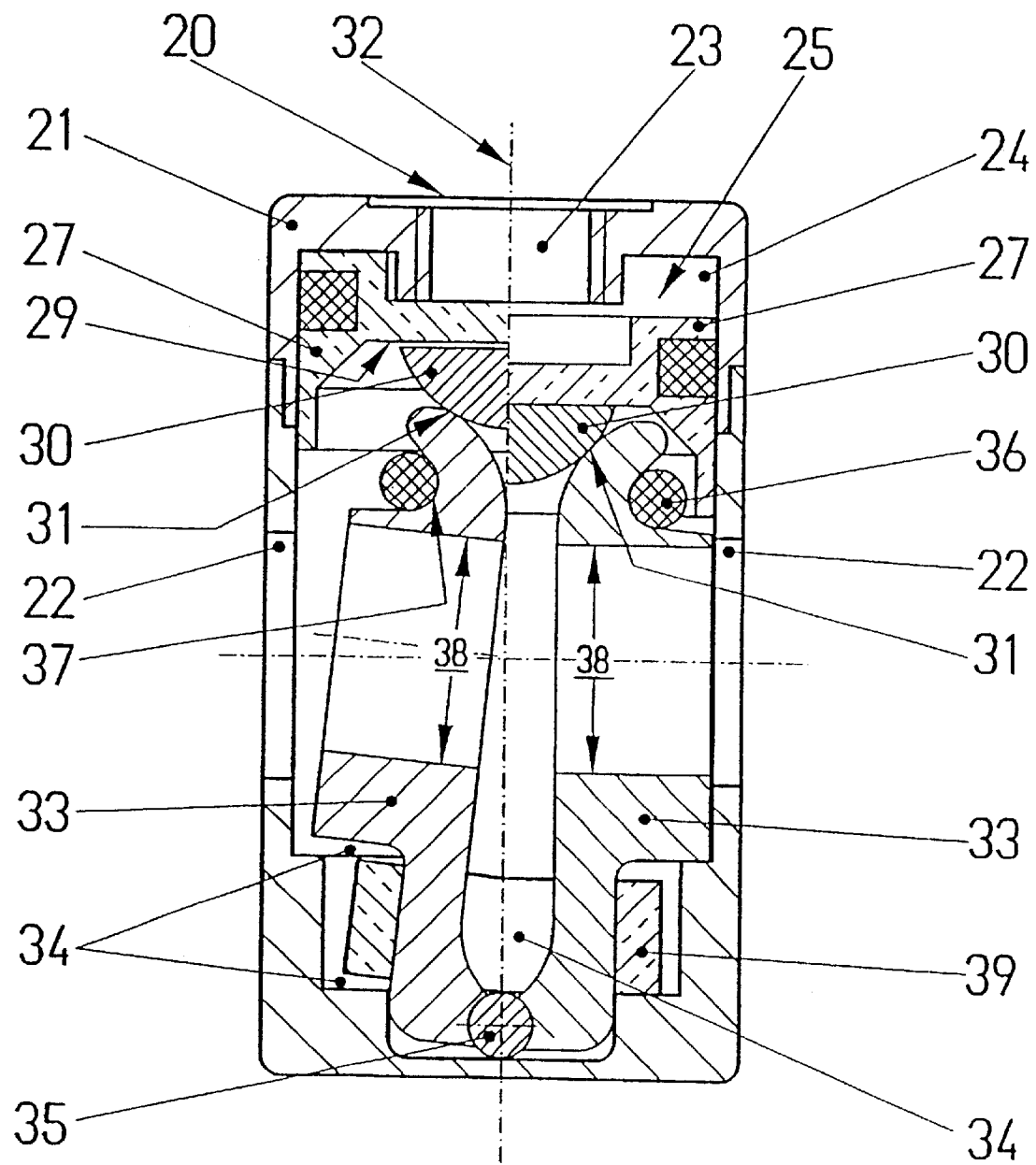
FIG. 3 shows a second embodiment of the invention.

The second embodiment according to FIG. 3, on its side facing away from tilt bearing 35 relative to through opening 38, has a plastic spring 36 designed as a plastic O-ring (toroidal) laid in a groove completely around the two clamping jaws 33 whereby, in addition, on the same side relative to the through openings 38 of tilt bearing 35, an additional spring 39, in the form of a hollow cylinder, is placed completely around the two clamping jaws 33.

Figure 4:
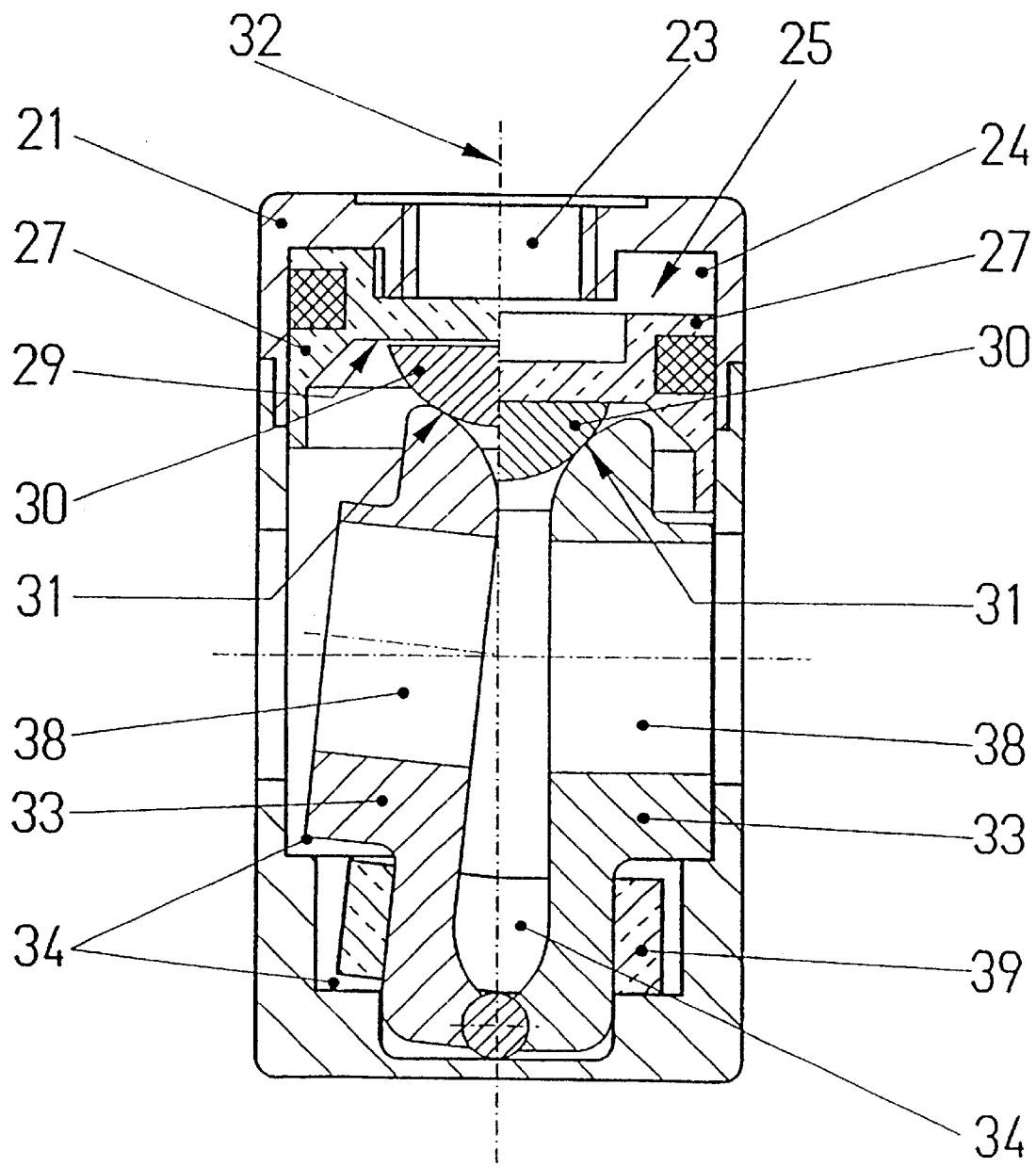
FIG. 4 shows a third embodiment of the invention.

In the third embodiment according to FIG. 4, the latter hollow cylindrical plastic spring 39 alone is provided.

Figure 5:
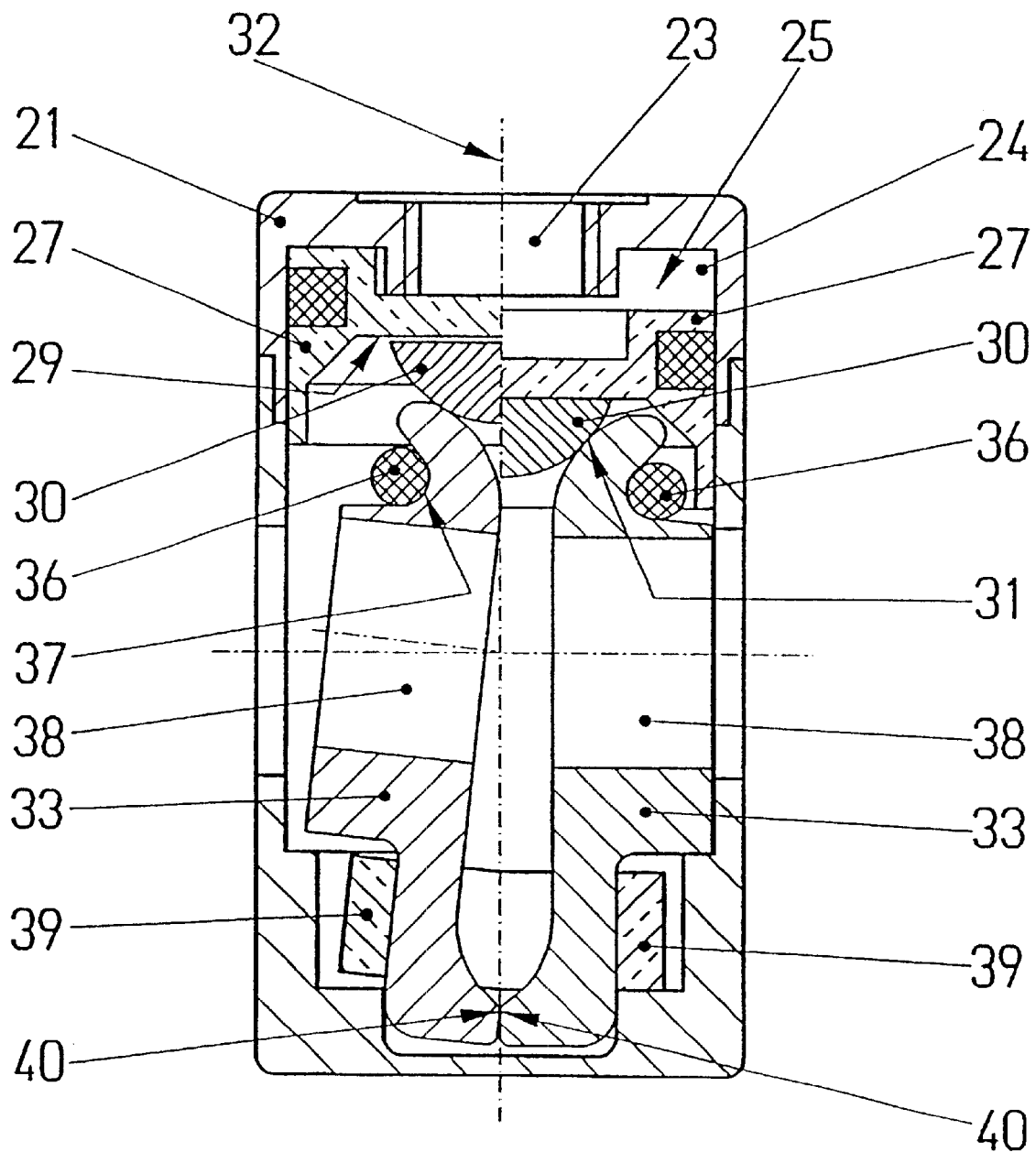
FIG. 5 shows a fourth embodiment of the invention.

The fourth embodiment according to FIG. 5, in general corresponds to that in FIG. 3, except that spacing pin 35 as a tilt bearing is omitted. Here, the clamping jaws 33 in this area 40 abut one another as tilt bearings.

Figure 6:
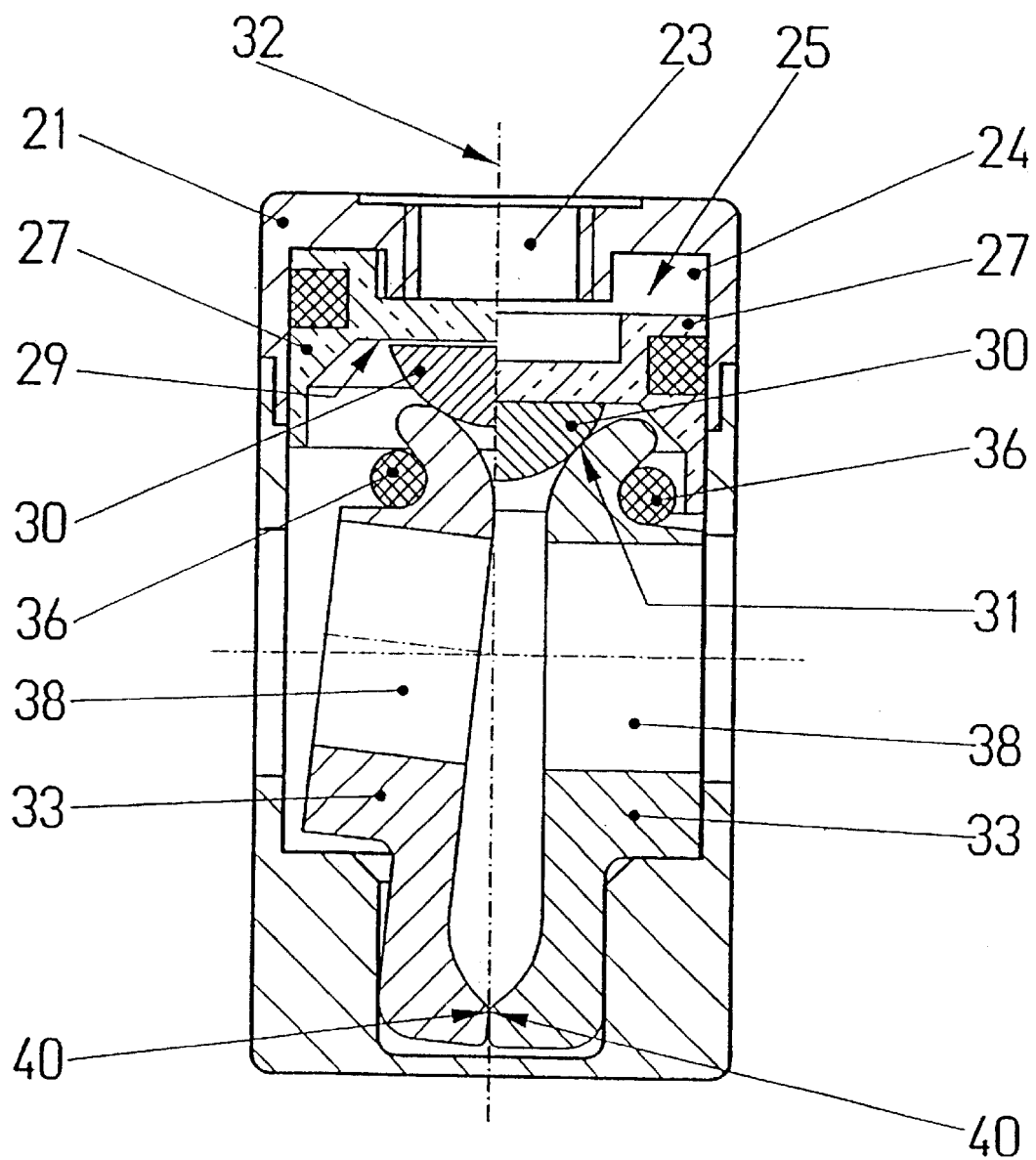
FIG. 6 shows a fifth embodiment of the invention.

The fifth embodiment according to FIG. 6, like the fourth embodiment in FIG. 5, does not have a separate spacing rod as a tilt bearing. By contrast, however, the hollow cylindrical spring provided in the tilt bearing area is omitted. It is only in the area facing away from the tilt bearing that a single toroidal closed O-ring 36 made of plastic, preferably polyurethane, is provided.

Figure 7:
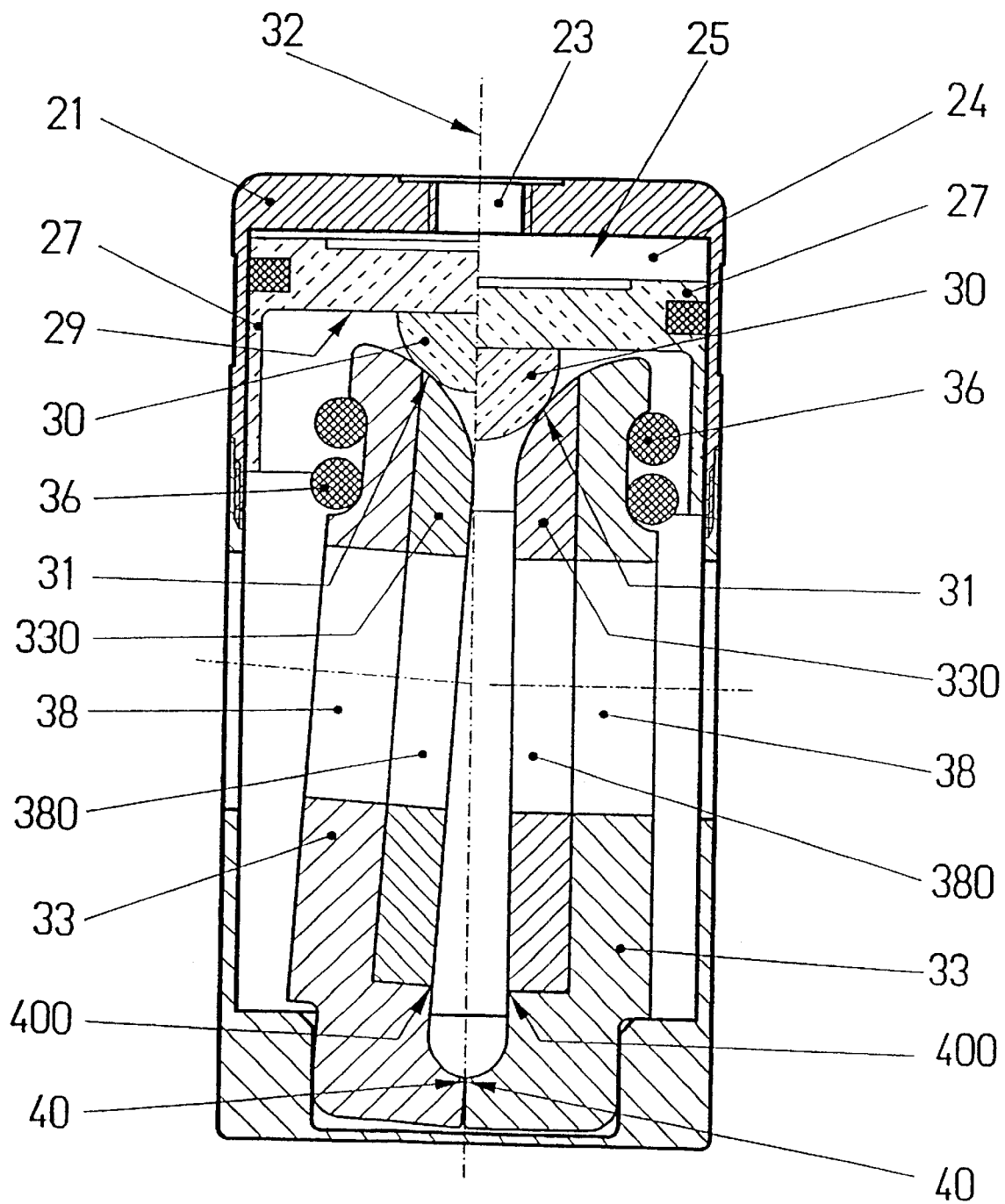
FIG. 7 shows a sixth embodiment of the invention.

The embodiment shown in FIG. 7, in contrast to the previous embodiments, has two springs 36, and each clamping jaw 33 is provided with an inner clamping jaw 330 that abuts it forcewise and has an internal through opening 380 flush with through opening 38. Clamping jaws 33 and 330 are pivotable around an internal pivot bearing 400 pivoted between an internal spread position (FIG. 7, right side) and an internal neighboring position (FIG. 7, left side) with the internal spread position and the internal neighboring position serving as fixed positions that establish forcewise the internal spread position and the internal neighboring position when the rod 12 assumes the fixed position holding inner clamping jaws 330 forcewise or the release position that allows rod 12 to move to the inner through openings (380) or vice versa. Actuating nose 30 then preferably abuts inner clamping jaws 330 by its control surface 31, said jaws being provided with these control surfaces or as are additionally with clamping jaws 33.

What is claimed is:

1. A locking device, comprising:

first and second symmetrically arranged clamping jaws, each clamping jaw having an opening permitting passage of a rod therethrough, each opening having a midpoint through which a longitudinal axis of the opening passes;

a tilt bearing having the clamping jaws tiltably positioned thereon for tilting between a released position in which the openings are aligned to permit longitudinal movement of the rod and a locked position in which the openings intersect at an angle to inhibit longitudinal movement of the rod;

a first spring urging the clamping jaws to the locked position;

a sleeve member having a piston chamber therein;

an actuating piston positioned in the piston chamber and responsive to introduction of a fluid into the piston chamber to move from a first position to a second position;

an actuating nose on the actuating piston, the actuating nose contacting the clamping jaws and allowing the first spring to bring the clamping jaws to the locked position when the actuating piston is in its first position, the actuating nose moving the clamping jaws to the released position when the actuating piston is moved to its second position;

the distance from the midpoint of each opening to the actuating nose being less than the distance from the midpoint to the tilt bearing.

2. A locking device according to claim 1, wherein:

the actuating piston, on a side thereof facing the clamping jaws, has a supporting plane that runs transversely to the actuating piston moving direction;

the actuating nose has a planar rear surface facing the supporting plane and floats loosely on the supporting plane; and the two clamping jaws are urged toward each other to the locked position by the first spring.

3. A locking device according to claim 2, wherein the supporting plane runs at right angles to the moving direction of the actuating piston.

4. A locking device according to claim 2, wherein the planar rear surface of the actuating nose runs at right angles to the moving direction of actuating piston.

5. A lifting device according to claim 1, wherein the actuating piston is made integral with the actuating nose.

6. A lifting device according to claim 1, further comprising a second spring, and wherein the first and second springs are fit at least partially around the two clamping jaws.

7. A locking device according to claim 1, wherein the first spring is placed around the clamping jaws in the vicinity of actuating nose.

8. A locking device according to claim 1, wherein the first spring is an O-ring or a hollow cylinder, circular in cross section.

9. A locking device according to claim 8, wherein the clamping jaws have circumferential grooves therein; and wherein the first spring comprises a completely closed ring in the circumferential grooves.

10. A locking device according to claim 1, wherein the actuating nose is a pin divided along its lengthwise axis.

11. A locking device according to claim 10 wherein the divided pin is divided in half.

12. A locking device according to claim 1, wherein the actuating piston is divided transversely to its direction into an actuating part and a stroke part, wherein the actuating part is loosely supported on the stroke part, and wherein the actuating part, is plane on its rear side and is supported so that it floats on a likewise plane front side of stroke part.

13. A locking device according to claim 12, wherein the actuating nose is on a side of the actuating part facing the stroke part.

14. A locking device according to claim 12, wherein the actuating part comprises a lid that has a U-shaped cross section and that has a planar rear side.

15. A locking device according to claim 14, wherein the lid and the first spring are mounted on ends of the clamping jaws.

16. A locking device according to claim 1, wherein the clamping jaws have beveled control surfaces, and the actuating nose cooperates with the beveled control surfaces.

17. A locking device according to claim 1, wherein the tilt bearing comprises a sleeve and a spacing rod secured to the sleeve.

18. A locking device according to claim 1, wherein the tilt bearing comprises a depression in the sleeve, on the side of the sleeve facing away from the actuating piston.

19. A locking device according to claim 1, wherein each of the clamping jaws comprises an outer clamping jaw portion and an inner clamping jaw portion, and wherein the inner clamping jaw portions are tiltable between an internal spread position and an internal neighboring position around the tilt bearing, with the internal spread position and the internal neighboring position serving as the locked position and the released position.

20. A locking device according to claim 19, wherein the inner clamping jaw portions are controlled by the outer clamping jaw portions.

21. A locking device according to claim 19, wherein the outer clamping jaw portions are controlled by the inner clamping jaw portions.

22. A locking device according to claim 19, wherein the outer clamping jaw portions are linked forcewise with the inner clamping jaw portions.

23. A locking device according to claim 19, wherein the inner clamping jaw portions, in the locked position, are adapted to hold the rod frictionwise.

24. A locking device according to claim 19, further comprising a compact cylinder including a movable rod, the compact cylinder having the housing therein, the locking device controlling movement of the rod.

25. A locking device according to claim 1, further comprising a housing having a recess adapted to the shape of the sleeve member.

26. A locking device according to claim 1, wherein edges of the aligned openings are adapted to abut the rod under urging of the first spring to bring the locking device into a self-locking position when the rod moves.

27. A locking device as claimed in claim 1, wherein the first spring is placed around the clamping jaws in the vicinity of the tilt bearing.

28. A locking device according to claim 1, wherein the first spring is made of plastic.

29. A locking device according to claim 1, wherein the first spring is a broken ring.

* * * * *